United States Patent [19]

Laskowski

[11] 4,078,474
[45] Mar. 14, 1978

[54] THREE DIMENSIONAL DUPLICATOR ASSEMBLY

[76] Inventor: Donald R. Laskowski, 2346 Fisher Ave., Indianapolis, Ind. 46224

[21] Appl. No.: 778,016

[22] Filed: Mar. 30, 1977

[51] Int. Cl.² .............................................. B23C 1/18
[52] U.S. Cl. ................................. 90/13.3; 144/144 R
[58] Field of Search .............................. 90/13.4, 13.3; 144/144 R, 139, 154, 323

[56] References Cited

U.S. PATENT DOCUMENTS 2,661,661   12/1953   Zoll ........................................ 90/13.4

Primary Examiner—J. M. Meister
Attorney, Agent, or Firm—Woodard, Weikart, Emhardt & Naughton

[57] ABSTRACT

The apparatus disclosed herein comprises a base having first and second platforms rotatably mounted thereto. First and second rods are mounted in parallel upon the base. First and second wheels have circumferential edges shaped to mate with the rods and are received thereon, a shaft spanning between the wheels and being received within central apertures defined by the wheels. Cables are secured to the rods and extend about the circumferential edges of the respective wheels to permit the wheels to roll but not slide along the rods. A mounting bracket is mounted to the shaft and a mount rod is rotatably supported by the mounting bracket. A stylus is mounted to one end of the mount rod; a router is mounted to the other end of the mount rod. The stylus is positionable against an object located on the first platfortt and the router is correspondingly positionable against a work piece located on the second platform. By appropriate, corresponding rotation of the first and second platforms and movement of the stylus against the object, the router will produce a three-dimensional reproduction of the object from the work piece.

9 Claims, 7 Drawing Figures

THREE DIMENSIONAL DUPLICATOR ASSEMBLY

BACKGROUND OF THE INVENTION

1. Field of the Invention

The present invention relates to devices capable of three-dimensional reproduction of an object.

2. Description of the Prior Art

The desire to reproduce objects of art and similar items has existed for a long time. As a result, a variety of machines or other devices capable of reproducing objects have been conceived. There has remained, however, a need for an apparatus of this type which is easily constructed and operated, and which is inexpensive. Moreover, it has remained desirable to provide an apparatus of this type which is of size and cost as to be practically available to individuals.

In U.S. Pat. No. 3,211,061, issued to Cretsinger on Oct. 12, 1965, there is disclosed a carving attachment for radial arm saws which allows limited three-dimensional reproduction of an object. The attachment comprises a downwardly extending yoke slidably mounted to a horizontal arm of the radial arm saw, and a shaft is rotatably mounted within the yoke. A plurality of members are mounted to the shaft to pivot in a horizontal plane, with a stylus being mounted to one of these members and a cutting attachment being mounted to another of these arms. Vertical motion of the cutting means is obtained by rotation of the shaft within the yoke. Movement of the cutting means in the horizontal plane is obtained by slidable movement of the yoke and by pivotal movement of the members attached to the shaft supported by the yoke, as well as by the normal pivotal movement of the arm of the radial arm saw.

In U.S. Pat. No. 3,460,433, issued to Pecchioli on Aug. 12, 1969, there is disclosed a pantograph copy milling machine which is also capable of limited three-dimensional reproduction. Vertical movement of the stylus and cutting tool is obtained by slidable movement along a supporting, vertical column. Movement in a horizontal plane is obtained by movement of the support (in which the stylus and cutting tool are mounted) by pivotal movement of arms connecting the support to the main portion of the tool, and also by rotation of the main portion relative the supporting vertical column. A comparable device comprising pivotally connected arms slidably mounted to a vertical column is disclosed in U.S. Pat. No. 2,260,157, issued to Zwick on Oct. 21, 1941.

Less relevant reproduction devices are disclosed in U.S. Pat. Nos. 2,742,823, issued to Compton on Apr. 24, 1956, and 3,796,129, issued to Cruickshank on Mar. 12, 1974. The Compton device consists of pivotally connected arms, with vertical movement obtained by sliding of the stylus and cutting tool within sleeve members. The Cruickshank device operates by tracing a series of successive, parallel lines of relief and thereby causes an otherwise two-dimensional reproduction to result in three-dimensional reproduction.

SUMMARY OF THE INVENTION

The present invention comprises an apparatus for the three-dimensional reproduction of an object which includes a base, a shaft having a central axis, means for mounting the shaft to the base to be movable relative the base along an axis perpendicular to the central axis of the shaft, a mounting bracket mounted to the shaft, the mounting bracket being rotatable about the central axis of the shaft, a mount rod rotatably supported by the mounting bracket, the mount rod having a first end portion and a second end portion, a stylus mounted to the first end portion of the mount rod, cutting means mounted to the second end portion of the mount rod, a first platform rotatably mounted to the base and positioned to permit an object placed thereon to be contacted by the stylus, and a second platform rotatably mounted to the base and positioned to permit a work piece placed thereon to be contacted by the cutting means, the first and second platforms being rotatable in parallel planes.

It is an object of the present invention to provide an apparatus for the three-dimensional reproduction of an object which is simple to construct and to operate.

Another object of the present invention is to provide an apparatus of the described type which may readily incorporate a router or similar device to act as the cutting means of the apparatus.

It is a further object of the present invention to provide a simple and reliable apparatus for three-dimensional reproduction which is capable of producing accurate reproductions of objects.

Further objects and advantages of the present invention will become apparent from the description of the preferred embodiments which follows.

DESCRIPTION OF THE PREFERRED EMBODIMENTS

Figure 1:
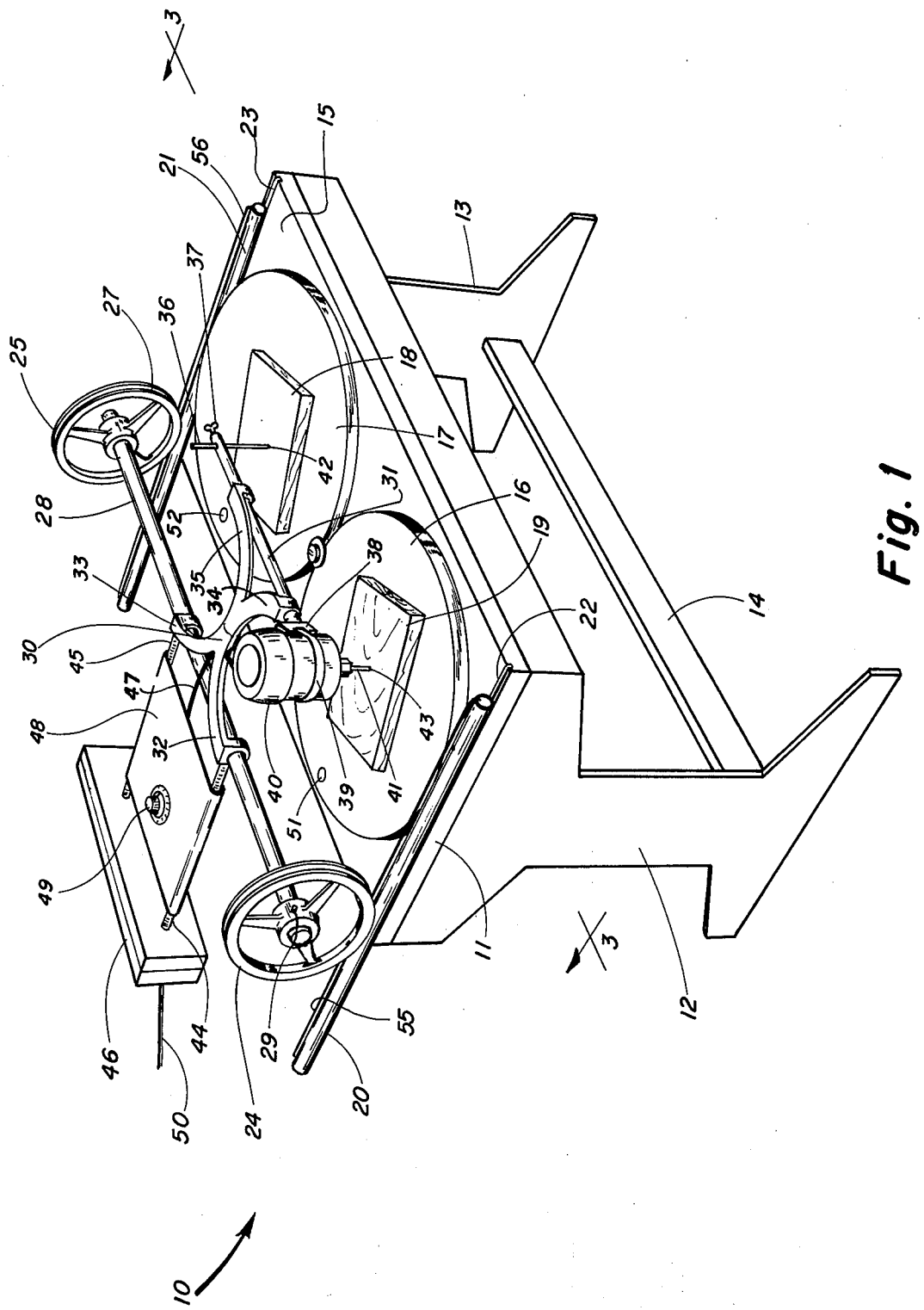
FIG. 1 is a perspective view of a three-dimensional reproduction apparatus in accordance with the present invention.
Figure 2:
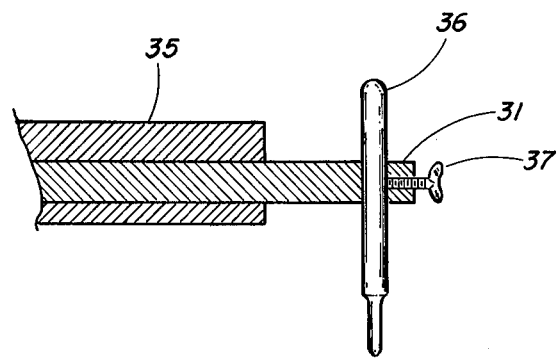
FIG. 2 is a partial, cross-sectional view of the stylus and attaching mechanism used in the preferred embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention provides a three-dimensional reproduction apparatus which is simple and inexpensive in construction, but which yields excellent reproductions. A particular feature of the present invention is that it may be used in conjunction with conventional hand-held routers which can be affixed thereto for providing the cutting means of the invention. Although other cuttings means could be employed in connection with the present invention, the description will pertain for the purposes of illustration to embodiments in which a router is used as the cutting means.

Although the present invention is simple and inexpensive in construction, the three-dimensional motion of the cutting means and the guiding stylus is obtained with a high degree of accuracy. It is not required, however, that the parts from which the present invention may be constructed have high control of tolerances, and the instrument therefore provides excellent reproduction with a minimum of cost.

Referring now to the FIGURES, there is shown a three-dimensional reproduction apparatus 10 constructed in accordance with the present invention. Apparatus 10 includes a stand 11 having vertical legs 12 and 13 connected by cross-beam 14. Table top 15 is secured to legs 12 and 13 and rotatably supports platforms 16 and 17. The object 18 to be reproduced is positioned upon platform 17 and a work piece from which the reproduction will be formed is similarly positioned upon platform 16.

Rails 20 and 21 are secured to top 15. Rails 20 and 21 are located in parallel grooves 22 and 23, respectively, and are thereby positioned in parallel with one another. Rails 20 and 21 are secured to top 15 by any suitable means, such as by bolts 57 (FIG. 3) which draw the rails firmly into the respective grooves.

Wheels 24 and 25 are received upon rails 20 and 21, respectively. Wheels 24 and 25 are of equal diameter and include circumferential grooves 26 and 27, respectively, which are shaped to mate with the rails. Cables 55 and 56 are secured to rails 20 and 21, respectively, and extend along the top thereof. Cables 55 and 56 also extend about the wheels 24 and 25, respectively, within their circumferential grooves as is known in the art, to permit the wheels to roll upon the respective rails, but to prevent the wheels from sliding relative the rails. This ensures that the position of the wheels relative the platform is maintained and prevents inaccuracy in the reproduction.

A cable tensioner is preferably associated with each of cables 55 and 56 to maintain frictional engagement of wheels 24 and 25. Various types of tensioners known in the art may be employed, such as by threading the cable through a diametric hole in a bolt securing the cable to the stand 11, and turning the bolt to wind up and thereby tighten the cable.

A shaft 28 extends between and is received within central apertures defined by the wheels 24 and 25, and is secured to the wheels by set screws, such as 29. Shaft 28 is thereby movable along an axis perpendicular to its central axis by the rolling of wheels 24 and 25 along rails 20 and 21. Mounting bracket 30 includes arms 32 and 33 which define apertures within which shaft 28 is received. Mounting bracket 30 is thereby rotatable about the central axis of shaft 28, and is slidable axially along shaft 28. Mounting bracket 30 further includes arms 34 and 35 which define apertures within which mount rod 31 is received. Mount rod 31 is rotatable relative arms 34 and 35, and is positioned parallel to shaft 28.

Stylus 36 is received within an aperture defined by mount rod 31 and positioned at one end thereof. A set screw 37 is threadedly received by the end of mount rod 31, and is screwed against stylus 36 to frictionally engage the stylus relative mount rod 31. A V-shaped member 38 is secured to the other end of mount rod 31. Router 40 is received against member 38 and is secured thereto by band 39. Band 39 has a free end which is secured to member 38 in accordance with known fastener mechanisms in order to frictionally engage router 40 against V-shaped member 38. The V-shaped member 38 aligns the router 40 with mount rod 31. Router 40 includes a router blade 41 having a cutting tip 43. Stylus 36 includes a tip 42, and tips 42 and 43 are preferably positioned at precisely corresponding radial distances and angles from mount rod 31. In this manner, the motion of tip 42 against the object 18 to be reproduced is correspondingly followed by the tip 43 of router 40, and a precise reproduction is obtained.

Threaded rods 44 and 45 are connected to arms 32 and 33, respectively, of mounting bracket 30. A counter-balance weight 46 is secured to rods 44 and 45 to offset the weight of the router 40 and other portions extending on the other side of shaft 28. Threaded rods 44 and 45 permit weight 46 to be positioned at a variety of positions relative shaft 28 to permit the desired counter-balance effect to be achieved. Counter-balance 46 thereby eliminates the factor of the weight of the router and other elements of the apparatus 10 and permits easier and more free movement of the stylus and router during the process of reproducing an object. Control of the apparatus 10 is therefore facilitated, and greater precision in the reproduction is made possible.

In the most preferred embodiment of the present invention, a control box 48, including a control dial 49, is mounted upon rods 44 and 45. The router 40, or other cutting tool employed by the apparatus 10 is connected to the control box through electrical cord 47. Control box 48 is coupled to a power source through electrical cord 50. Control box 48 may simply provide an on-off control, but more preferably includes control dial 49 which permits selection of a variable range of power settings for the cutting means. Dial 49 thus permits the operable speed of the cutting device, such as router 40, to be matched with the material of the work piece from which the duplication will be produced.

Indexing means are provided to permit the rotational positions of platforms 16 and 17 to be precisely controlled and correlated. Platforms 16 and 17 include holes 51 and 52, respectively, which are sized to receive the rotor blade 41 and stylus 36, respectively. Alternatively, hole 51 may be sized to receive a plain rod inserted into router 40 for the purpose of aligning and moving platforms 16 and 17. Preferably, apparatus 10 is initially set up by providing hole 52 in platform 17. Stylus 36 is then positioned at hole 52, and the router 40 is used to cut hole 51 in a corresponding rotational position. In order to correlate the rotational positions of platforms 16 and 17, apparatus 10 is simply manipulated to position router blade 41 within hole 51 and to position stylus 36 within hole 52. Movement of mounting bracket 30 and mount rod 31 while maintaining the router blade 41 and stylus 36 in position within the respective holes will permit the platforms to be rotated in direct correlation with each other.

The platforms may be caused to be rotated as previously described by the movement of wheels 24 and 25 along rails 20 and 21, respectively, and by the simultaneous movement of the router 40 and stylus 36 axially with respect to shaft 28. When platforms 16 and 17 are in a corresponding position, the work piece 19 is positioned in a suitable location with respect to the placement of object 18 upon platform 17. Object 18 and work piece 19 are then attached to the platforms in any suitable manner, such as by external clamping or simply by nailing or gluing the objects to the respective platforms.

Figure 3:
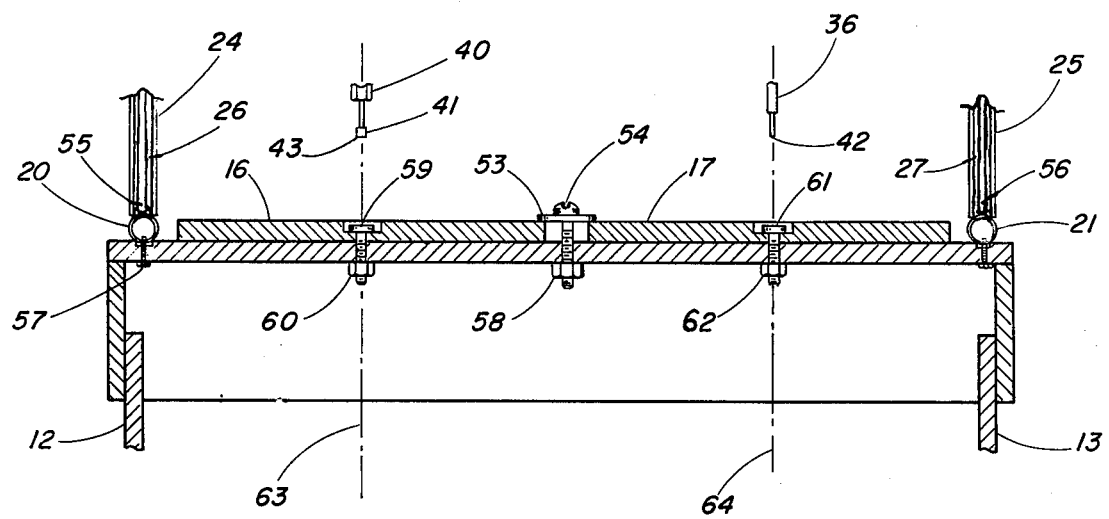
FIG. 3 is a partial, cross-sectional view of the apparatus of FIG. 1, taken along the line 3—3 in FIG. 1 in the direction of the arrows.

The platforms are held in corresponding positions by frictional engagement with table top 15. As shown in FIG. 3, bolt 54 and nut 58 are used to position washer-like member 53 against the tops of platforms 16 and 17, and to thereby frictionally engage the platforms against table top 15. A variety of other methods of securing platforms 16 and 17 in the selected positions could similarly be employed, although the shown and described mechanism is preferred due to its simplicity.

Platforms 16 and 17 are rotatably mounted upon table top 15. Platforms 16 and 17 are rotatable about and secured to top 15 by bolts 59 and 61, respectively, secured by nuts 60 and 62 (FIG. 3). Tip 42 of stylus 36 and tip 43 of router blade 41 are positioned to precisely correspond with the centers 64 and 63 of platforms 17 and 16, respectively. In this manner, the position of tip 42 of stylus 36 relative the object 18 to be reproduced will directly correspond with the position of tip 43 of router blade 41 with respect to the work piece 19, even after the platforms 16 and 17 have been correspondingly rotated.

The combination of elements comprising the present invention provides for precise and full control of the movement of the stylus 36 and router 40. Horizontal movement perpendicular to the central axis of shaft 28 is obtained by the rolling of wheels 24 and 25 along rails 20 and 21, respectively. Cables Bands 55 and 56 prevent slippage of the wheels along the respective rails, and therefore maintain positive alignment of the wheels with respect to the rails and to the platforms 16 and 17. Axial movement relative shaft 28 is obtained by mounting bracket 30 being slidably received upon shaft 28, and also by mount rod 31 being slidable relative mounting bracket 30. Vertical movement of stylus 36 and router 40, or more particularly of the tips 42 and 43 thereof, is obtained by the rotation of mounting bracket 30 about the central axis of shaft 28, and in a lesser degree by the rotation of mount rod 31 relative mounting bracket 30. Since the platforms 16 and 17 may be simultaneously and correspondingly rotated relative top 15, and due to the ability to freely move the stylus and router in three degrees of freedom, and object 18 placed upon platform 17 may be fully and accurately reproduced from a work piece 19 mounted upon platform 16, and accurate reproduction of essentially all detail is made possible.

To insure an accurate reproduction of an object 18, it is preferable that platforms 16 and 17 be located in the same plane, and that the plane within which the platforms are located be parallel to the plane defined by the parallel rails 20 and 21. Mount rod 31 is positioned parallel to shaft 28, with the mount rod 31 and shaft 28 being positioned parallel to a line connecting the rotational centers 63 and 63 of platforms 16 and 17.

Figure 4:
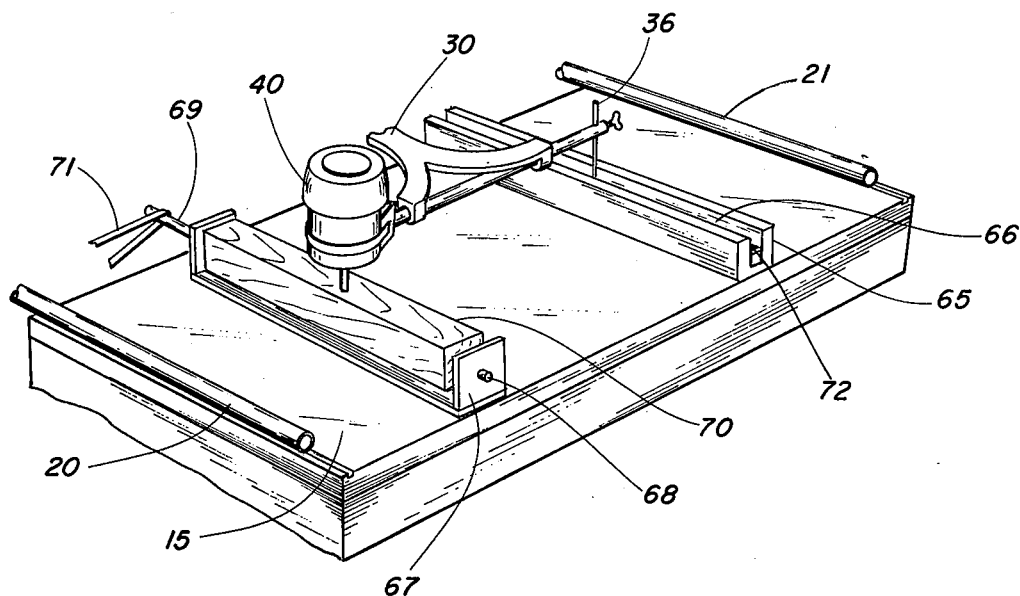
FIG. 4 is a partial, perspective view of a modified form of the apparatus of FIG. 1.
Figure 5:
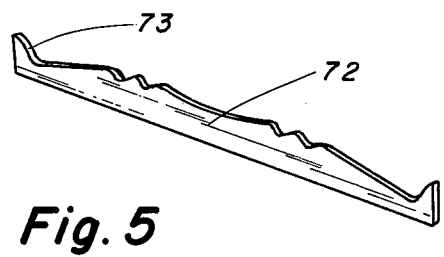
FIG. 5 is a perspective view of a guide used in the modified apparatus of FIG. 4.

Referring now to FIGS. 4 and 5, there is shown a modified version of the three-dimensional reproduction apparatus of the present invention. The apparatus of FIG. 4 is in most respects identical with apparatus 10 of FIG. 1. However, platforms 16 and 17 are not present upon table top 15. Instead, a guide 65 and a frame 67 are mounted in parallel upon top 15. Guide 65 includes a longitudinal slot 66 positioned to receive stylus 36 therein. Frame 67 includes rods 68 and 69, upon which a work piece 70 may be mounted. Rod 69 is drivable by a belt 71 connected to a suitable drive motor (not shown), and rods 68 and 69 are rotatably received by frame 67. Belt 71 in operation thereby drives rods 68 and 69, and work piece 70, in rotation. A form 72 (FIG. 5) is received within slot 66 of guide 65, and includes a top surface 73 corresponding to the desired exterior contour of the finished work piece 70. Stylus 36 is operable to be moved along and adjacent to the surface 73 and router 40 will act upon rotating work piece 70 to produce a similar contour.

Figure 6:
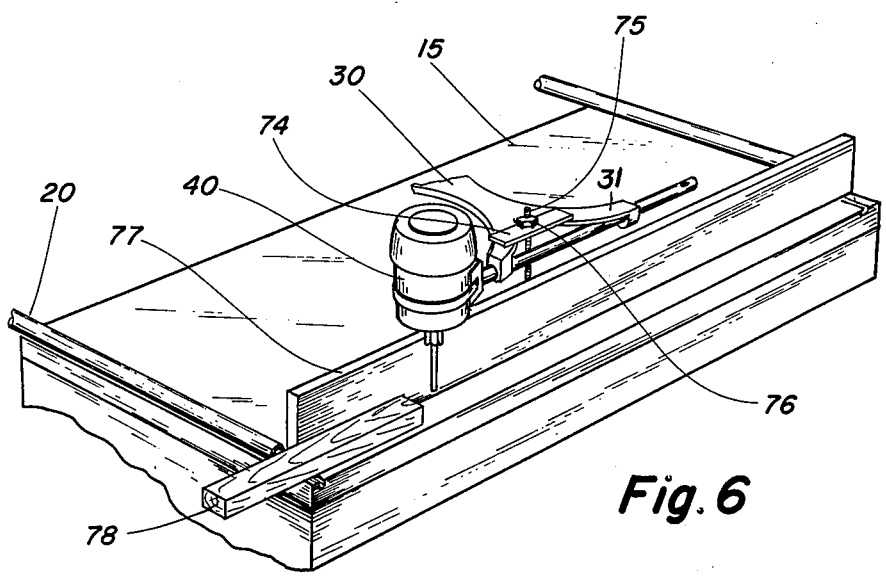
FIG. 6 is a partial, perspective view of a second modified version of the apparatus of FIG. 1.

In FIG. 6 there is shown a second modified version of the apparatus of FIG. 1. Platforms 16 and 17 are absent from top 15. Mounting bracket 30 is secured to top 15 by a bar 74 which is held against mounting bracket 30 by nut 76, which is threadedly received upon bolt 75. Router 40 may be oriented in any desired position, and is secured therein by securing the mount rod 31 against rotation relative mounting bracket 30. This may be accomplished in accordance with various known techniques such as by providing a set screw which is received by an arm of the mounting bracket 30 and is operable to frictionally engage against mount rod 31. A fence 77 is positioned upon top 15 and a work piece, such as 78, is moved along guide 77 and thus acted upon by router 40. Router 4 is thus operated as a shaper to shape and mold the work piece 78 as desired. The router 40 may be positioned at a variety of angles from vertical and may use a variety of shapes of cutting blades, thereby providing a corresponding variety of shapes in the work piece 78.

Figure 7:
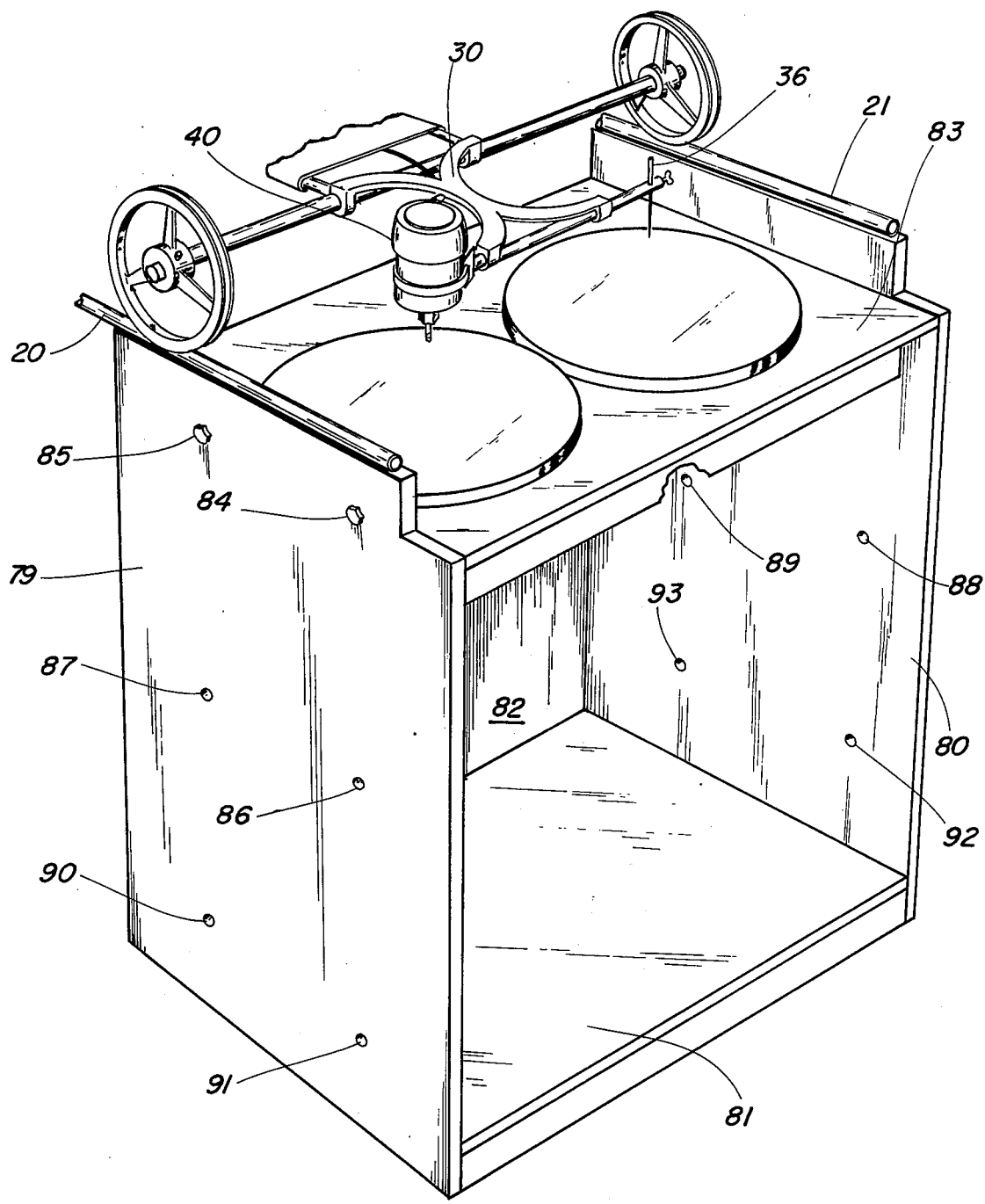
FIG. 7 is a partial, perspective view of a three-dimensional reproduction apparatus in accordance with the present invention, there being shown an alternate version of the base which includes a vertically adjustable top.

Referring now to FIG. 7 there is shown an alternate embodiment of a supporting stand utilized by the present invention. Platforms 16 and 17 are rotatably mounted upon top 83 in the same fashion as described with respect to the embodiment of FIG. 1. Top 83 is connected to sides 79 and 80 by bolts, such as 84 and 85. Bottom 81 and back 82 are suitably attached to sides 79 and 80 to provide proper alignment of the sides. As is apparent from FIG. 7, top 83 may be positioned at a variety of vertical locations to permit the three-dimensional reproduction apparatus to be used to reproduce objects of substantial height. Thus, apertures 86–89 are provided at a second, vertical position, and top 83 may be released from its shown position and bolted into position through holes 86–89. Similarly, additional holes are provided at alternate vertical levels, such as holes 90–93. In this manner, the three-dimensional reproduction apparatus may be adapted to reproduce an object of considerable height. More particularly, an object of considerable height is reproduced in sections by first reproducing the lowest portion of the object and then progressively lowering the table top 83 to permit eventual completion of the reproduction process.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. An apparatus for the three-dimensional reproduction of an object comprising:
   a base;
   a shaft having a central axis;

means for mounting said shaft to said base to be movable relative said base along an axis perpendicular to the central axis of said shaft;

a mounting bracket mounted to said shaft, said mounting bracket being rotatable about the central axis of said shaft and slidable axially along said shaft;

a mount rod rotatably supported by said mounting bracket, said mount rod having a first end portion and a second end portion;

a stylus mounted to the first end portion of said mount rod;

cutting means mounted to the second end portion of said mount rod;

a first platform rotatably mounted to said base and positioned to permit an object placed thereon to be contacted by said stylus; and a second platform rotatably mounted to said base and positioned to permit a work piece placed thereon to be contacted by said cutting means, said first and second platforms being rotatable in parallel planes.

2. The apparatus of claim 1 in which said first and second platforms are rotatable in a common plane.

3. The apparatus of claim 1 and which further includes indexing means for ensuring that the rotational position of one of said first and second platforms corresponds to the rotational position of the other of said first and second platforms.

4. The apparatus of claim 1 in which said means for mounting said shaft comprises a first wheel and a second wheel, the first and second wheels being of equal diameter, the first and second wheels each defining a central aperture in which one end of said shaft is received, said means for mounting said shaft further comprising a first rod and a second rod, the first rod being mounted to said base and the second rod being mounted to said base, the first and second rods being parallel, the first and second wheels having circumferential edges shaped to mate with the first and second rods, the first and second wheels being received upon and rollable along the first and second rods, respectively, whereby said shaft is being movable along an axis perpendicular to the central axis of said shaft and parallel to the first and second rods.

5. The apparatus of claim 4 in which said means for mounting said shaft further comprises first and second cables, the first and second rods each having first and second ends, the first cable having a first end secured to the first end of the first rod and further having a second end secured to the second end of the first rod, the first cable extending about the circumferential edge of the first wheel, the second cable having a first end secured to the first end of the second rod and further having a second end secured to the second end of the second rod, the second cable extending about the circumferential edge of the second wheel, whereby the first and second wheels are permitted to roll along the first and second rods and are prevented from sliding along the first and second rods.

6. The apparatus of claim 5 in which said first and second platforms are rotatable in a common plane.

7. The apparatus of claim 6 and which further includes indexing means for ensuring that the rotational position of one of said first and second platforms corresponds to the rotational position of the other of said first and second platforms.

8. The apparatus of claim 7 and which further includes locking means for locking said first and second platforms in a selected rotational position.

9. The apparatus of claim 1 in which said base includes a top, said first and second platforms being rotatably mounted to the top, said apparatus further including adjustment means for varying the vertical position of the top relative said shaft.

* * * * *